(No Model.) 4 Sheets—Sheet 1.

E. THOMSON.
METHOD OF ELECTRIC WELDING.

No. 451,345. Patented Apr. 28, 1891.

ATTEST:
J. H. Hurdle
H. M. H. Capel

INVENTOR:
Elihu Thomson
By H. C. Townsend
Attorney (No Model.) 4 Sheets—Sheet 2.

E. THOMSON.
METHOD OF ELECTRIC WELDING.

No. 451,345. Patented Apr. 28, 1891.

ATTEST:

INVENTOR:
Elihu Thomson

By H. C. Townsend
Attorney (No Model.)  
4 Sheets—Sheet 3.

E. THOMSON.
METHOD OF ELECTRIC WELDING.

No. 451,345. Patented Apr. 28, 1891.

ATTEST:  
J. H. Hurdle  
Hy. H. Capes

INVENTOR:  
Elihu Thomson  
By H. C. Townsend  
Attorney (No Model.)  4 Sheets—Sheet 4.

E. THOMSON.
METHOD OF ELECTRIC WELDING.

No. 451,345. Patented Apr. 28, 1891.

ATTEST:

INVENTOR:
Elihu Thomson
By H. L. Townsend
Attorney

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

METHOD OF ELECTRIC WELDING.

SPECIFICATION forming part of Letters Patent No. 451,345, dated April 28, 1891.

Application filed June 14, 1890. Serial No. 355,500. (No model.)

*To all whom it may concern:*

Be it known that I, ELIHU THOMSON, a citizen of the United States, and a resident of Swampscott, in the county of Essex and State of Massachusetts, have invented a certain new and useful Method of Electric Welding, of which the following is a specification.

My invention relates to metal-working operations in which electricity is employed as the heating agent for bringing the metal that is to be welded or joined or is to be shaped or otherwise treated to the desired working temperature. The invention relates particularly, however, to the operation of joining two metal pieces by welding, and is especially applicable to lap-welding, or to welding processes wherein the pressure which unites the pieces is applied in a line transverse to the general plane in which the pieces to be joined lie.

In the method or process of welding by electricity as ordinarily practiced prior to my invention the pressure, hammering, or other uniting force has been applied simultaneously with the application of the heating electric current designed to bring the work to the proper plastic condition. According to the present invention, however, the welding, forging, or shaping is effected after the work has been brought to the proper condition by the action of the current—that is to say, the electric current is first caused to flow until the pieces of metal to be united are brought to the desired welding or working temperature, after which the current is withdrawn and the pressure for welding, forging, or other operation is then applied by subjecting the work either in the same or another apparatus to the action of hammers, rolls, dies, or other suitable devices.

Figure 1:
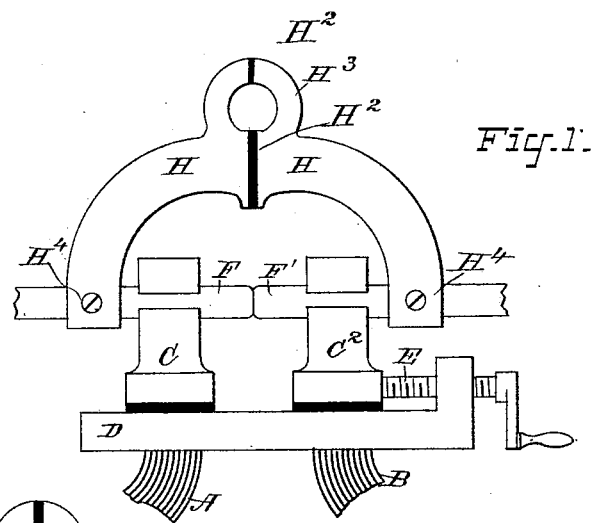
Figure 3:
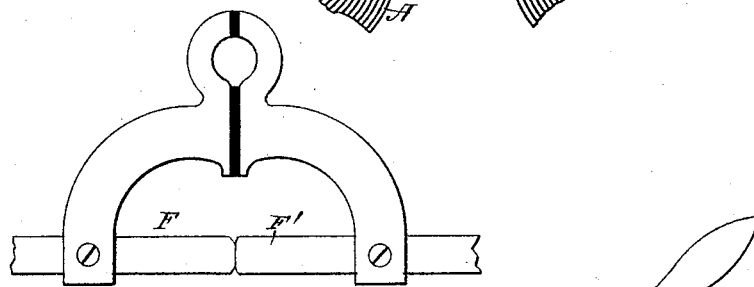
Figure 2:
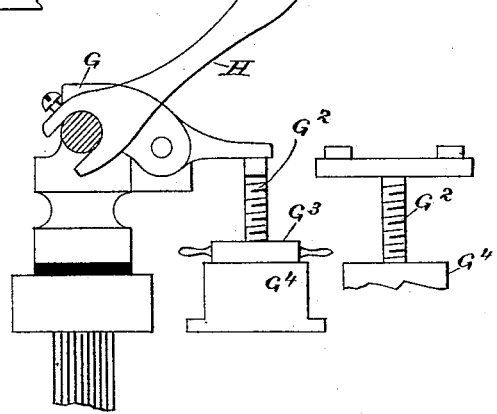
Figure 4:
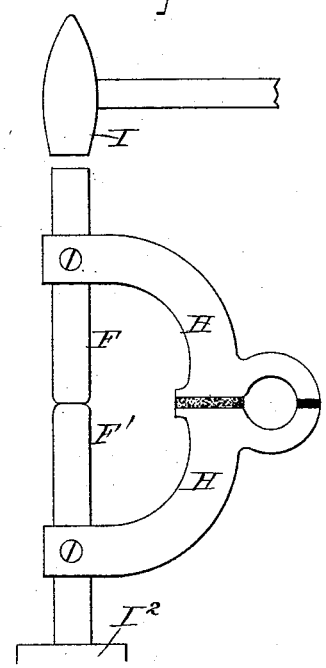
Figure 5:
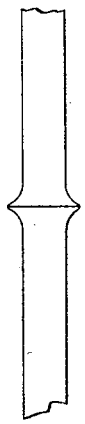
Figure 6:
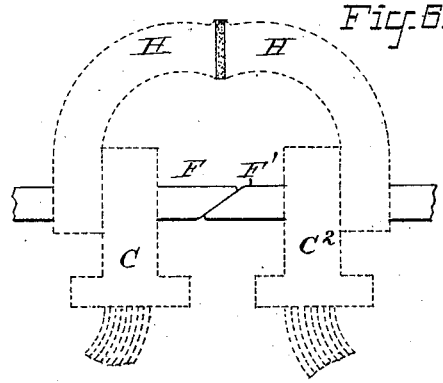
Figure 7:
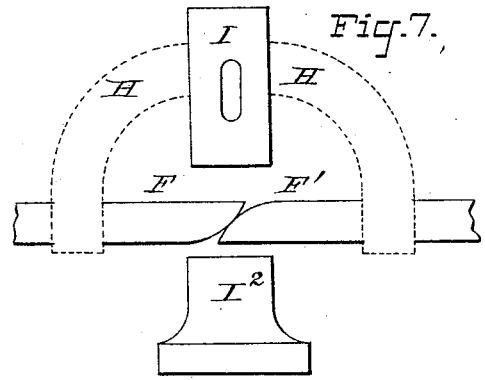
Figure 8:
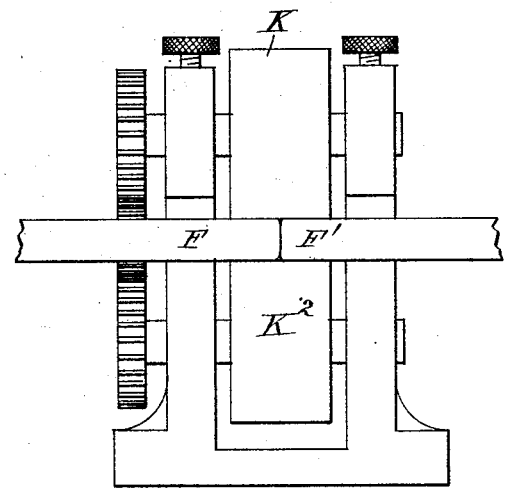
Figure 9:
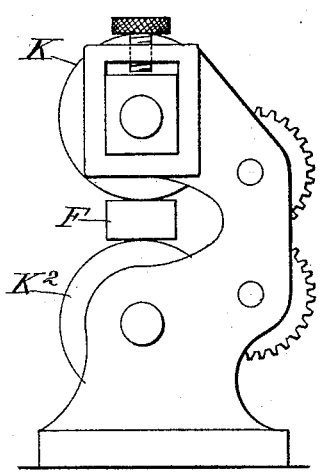
Figure 10:
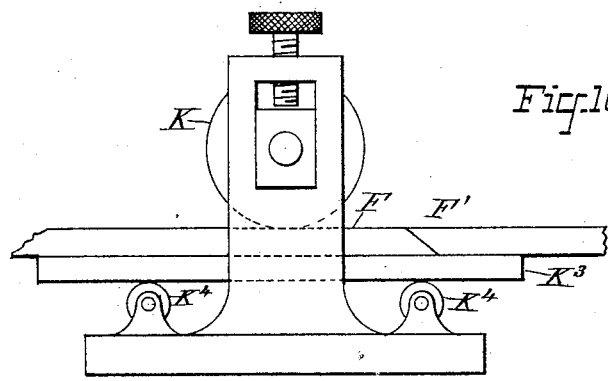
Figure 11:
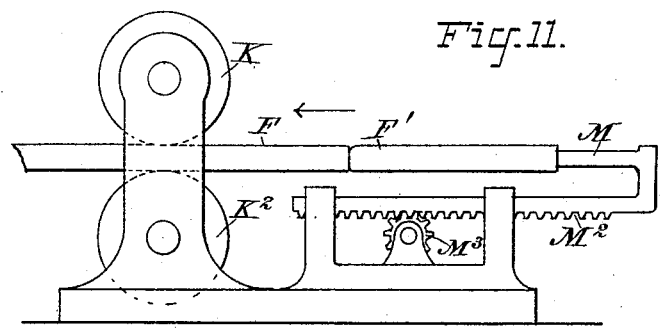
Figure 12:
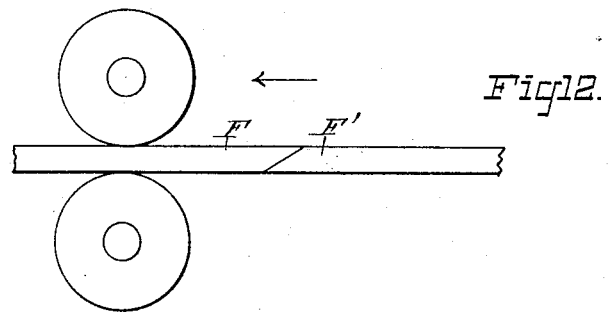
Figures 13, 14:
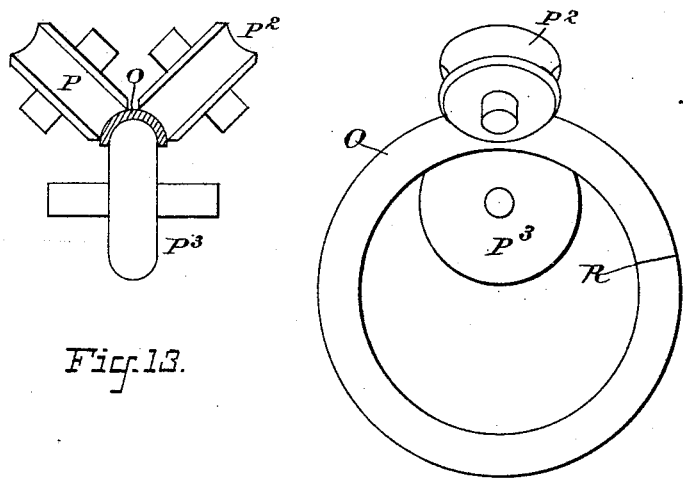

In the accompanying drawings, Figure 1 is a side elevation of the apparatus that may be used for holding the work to be heated. Fig. 2 is an edge view of the same. Figs. 3, 4, and 5 illustrate various stages of the operation in butt-welding. Figs. 6 and 7 illustrate lap-welding. Figs. 8, 9, and 10 show apparatus for applying pressure to the work by means of rolls or dies in welding or other operations. Figs. 11 and 12 show other ways of applying rolls. Fig. 13 is an edge view, and Fig. 14 is a side view, of rolls applied in forming and welding U-shaped tires, rings, or other objects.

Referring to Fig. 1, C C² are suitable clamps or holders by which the piece or pieces of metal to be heated may be secured. These clamps or holders are connected by cables A B, or in other ways, with a suitable source of electricity of large volume, but low electromotive force, as described in the specification of former United States Letters Patent, dated the 10th day of August, A. D. 1886, No. 347,140. The clamps are insulated from one another and supported upon a suitable bed D. One of them, as C², is provided with a pressure-screw E, by which it may be slid toward the opposite clamp or holder.

F F' indicate the two pieces of metal to be welded together by butt-welding.

The clamp-jaws of the apparatus may be constructed as shown more fully in edge view, Fig. 2.

G is the clamp-jaw, the tail of which is engaged by a screw G², which may be worked up and down by means of a nut G³, resting on a suitable bed G⁴. By turning the nut the clamp-jaw may be forced down upon the work to hold it squarely upon the clamp-bed.

According to one method of practicing the present invention I proceed as follows: The piece or pieces of metal F F' are secured in the clamps and are adjusted so that the surfaces to be united will be brought into the necessary contact to insure the passage of the current from one to the other. The degree of contact may be determined or varied by means of the screw E as required. The necessary contact having been produced to allow the passage of the current, the electric current is caused to flow, thus heating the pieces F F' at the point of contact and contiguous thereto. After they have been brought to the working heat at this point the current is cut off in any desired way. After cutting the current off and while the pieces retain their desired temperature the pressure is applied to unite them. This welding pressure may be applied by means of the screw E, the pieces retaining their position in the clamps, or the pieces are removed from the clamps and during transportation to another position or to another apparatus are caused to retain approximately their correct relative position. In some cases the heating of the parts would cause a slight adhesion or produce an incipient weld, which will be sufficient to hold them together during transportation; but I prefer to employ a supplemental holder or clamp, such as indicated at H, which is in the form of a yoke made in two parts, insulated from one another, preferably as at H², and provided with an eye H³, by which the yoke may be lifted with the work in place. The lower ends of the yoke at H⁴ have suitable clamping devices or screws by which the pieces F F' may be fastened to the yoke and held during transportation.

Fig. 3 illustrates the work as held by the yoke or support H H during transportation after it has been taken out hot from the apparatus, Fig. 1.

In Fig. 4 one way of applying the pressure or force that will unite the parts by a butt-weld is shown. Here I show a hammer I, as employed for forcing the part F against the part F', the latter resting in the meantime upon the bed I². In this case it is obvious that the part F must be permitted to slide in the holder or yoke H.

Fig. 5 illustrates the complete butt-weld.

Figs. 6 and 7 illustrate the application of the process to the formation of lap-welds. Here the parts F F' are scarfed when put into the holders C C², and while resting in good contact at their scarfed ends are heated at such point by the passage of an electric current, as before described, until they have obtained the proper welding temperature. The current having been removed either by cutting off the flow of current to the holders C C² or by detaching the pieces F F' from the clamps or holders C C², the said pieces are placed in position on an anvil I², Fig. 7, and are hammered or otherwise worked in order to weld them together.

Figs. 8 and 9 show in edge view and side view a set of rolls that may be employed for imparting the desired pressure to effect a union of the pieces after the same have been heated to the desired plasticity by the current. As before described, the pieces F F' are first heated to the desired plasticity, and then after the removal of the heating-current are subjected to the action of the rolls, dies, or other devices for applying the pressure. In Figs. 8 and 9 two rolls K K² are shown for applying the pressure. They are geared together, as is usual with metal rolls, and the upper roll is preferably mounted in bearings, which have a movement up and down in the frame, adjusted, however, by means of suitable screws, so that as the work is reduced the rolls may be adjusted nearer together. The pieces F F' are in this case fed in sidewise between the rolls, and the joint between them may be either a butt-joint or a scarfed or lap joint.

In Fig. 10 the pieces to be welded are fed in lengthwise under a roll K, and are supported upon a table K³, which moves on rolls or bearings K⁴. The roll K is adjusted up and down in a frame to suit various sizes of work and to adjust or vary the pressure applied.

When the apparatus, Fig. 10, is employed, the work F F' is first placed in suitable clamps or holders, through which current may be passed into the work and across the joint to heat the joint to the desired plasticity. The pieces F F' are then removed and placed upon a table K³, which is fed beneath the roll K to effect the weld. As is obvious, the same operation might be resorted to if the rollers were formed on their surfaces to act as dies or forming-rolls. In such case it is obvious that the work might consist of a continuous piece of material to which a particular shape is to be imparted, or the forming operation might be simultaneous with a welding operation wherein two pieces are to be joined together.

In Fig. 11 I have shown the combination of pressure applied in a line transverse to the general plane that the pieces occupy and end pressure applied to the said pieces at the same time. Here the rolls act, as before described, after the work has been heated to the desired plasticity by the electric current. The end pressure is applied by means of a follower M, which is carried by a rack M², driven by a cog-wheel M³. The end pressure so applied serves also to feed the work in between the rolls K K².

The same device might be applied, as indicated in Fig. 12, to the lap-welding of pieces F F', previously heated in an apparatus, such as shown in Fig. 1, or in any other desired apparatus for feeding currents into the pieces, said pieces being transported in proper relative position after heating to the rollers for applying the pressure.

In Figs. 13 and 14, O is a U-shaped ring, and the devices for applying the proper pressure for welding or forming after the ring has been subjected to the heating electric current are indicated at P P² P³. The roll P³ is a mandrel-roll of the proper form for giving the correct internal shape to the ring O, and the rolls P P² press upon the exterior and are properly shaped at their edge, as indicated.

R, Fig. 14, indicates the point where the weld or junction is to be formed, which part is heated by the application of the electric current supplied to the ring through suitable clamps and flexible conductors, and caused to pass across the point R until the proper welding temperature is attained, after which the clamps are removed and the ring is fed around through the rolls to effect the union by the laterally-applied pressure of such rollers.

What I claim as my invention is—

1. The herein-described method or process of welding or shaping metals by the agency of electricity and pressure applied through the rolls, hammers, or other devices, consisting in first heating the part of the metal to be operated upon to the proper working temperature by passing an electric current through such part, then breaking the electric circuit, and after the removal of the current subjecting such part to the action of rolls, hammers, dies, or other devices.

2. The herein-described improvement in electric welding, which consists in placing the pieces to be welded in contact with one another at the proposed joint, passing an electric current across the joint until the metal at such joint and contiguous thereto is heated to the proper plasticity, removing the heating-current, and then applying the pressure or other force for effecting the weld.

3. The herein-described method or process of forming a joint between two pieces of metal, consisting in placing the same in electric contact or connection, passing an electric current from one to the other in volume sufficient to heat the same at the joint to welding temperature, and then subsequently to the application of the heating-current subjecting the joint to the action of rolls, hammers, dies, or other devices applied in a line transverse to the general plane of the pieces to be welded, as and for the purpose described.

4. The herein-described method or process of forming a weld between two pieces of metal, consisting in placing the pieces in electrical contact at the point of proposed union, passing an electric current across the point of union until the pieces are heated to the desired plasticity, cutting off the electric current, and then forcing the pieces together by end pressure.

5. The herein-described method or process of electric welding, consisting in placing the pieces to be welded in contact with one another, passing an electric current from one to the other across the line of contact while they remain in contact or connection until they are heated to the proper working temperature, and then applying the pressure for welding by subjecting the pieces at the point of contact and either in the same or another apparatus to the action of hammers, rolls, dies, or other suitable devices applied in a general direction transverse to the plane in which the pieces lie, as and for the purpose described.

Signed at Lynn, in the county of Essex and State of Massachusetts, this 11th day of June, A. D. 1890.

ELIHU THOMSON.

Witnesses:
JOHN W. GIBBONEY,
DUGALD MCKILLOP.